United States Patent
Taylor et al.

(10) Patent No.: US 8,553,036 B2
(45) Date of Patent: Oct. 8, 2013

(54) SYSTEMS AND METHODS FOR DISPLAYING PATIENT-RELATED DATA

(75) Inventors: Randy Lynn Taylor, Murray, UT (US); Mohit K. Rohella, Murray, UT (US); Jose Avila, Murray, UT (US); George M. Philip, Murray, UT (US)

(73) Assignee: General Electric Company, Schenectady, NY (US)

( * ) Notice: Subject to any disclaimer, the term of this patent is extended or adjusted under 35 U.S.C. 154(b) by 251 days.

(21) Appl. No.: 13/031,490

(22) Filed: Feb. 21, 2011

(65) Prior Publication Data
US 2012/0212493 A1    Aug. 23, 2012

(51) Int. Cl.
*G09G 5/22* (2006.01)
*G06T 11/20* (2006.01)

(52) U.S. Cl.
USPC ........................................ 345/440.2; 345/440

(58) Field of Classification Search
USPC .............................. 345/418, 440.2
See application file for complete search history.

(56) References Cited

U.S. PATENT DOCUMENTS

| | | | |
|---|---|---|---|
| 2010/0298718 A1* | 11/2010 | Gilham et al. | 600/484 |
| 2012/0075103 A1* | 3/2012 | Powell et al. | 340/573.1 |
| 2012/0198341 A1* | 8/2012 | Pekarske et al. | 715/733 |

OTHER PUBLICATIONS

Yannis Ioannidis. 2003. The history of histograms (abridged). In Proceedings of the 29th international conference on Very large data bases—vol. 29 (VLDB '2003), Johann Christoph Freytag, Peter C. Lockemann, Serge Abiteboul, Michael J. Carey, Patricia G. Selinger, and Andreas Heuer (Eds.), vol. 29. VLDB Endowment 19-30.*

* cited by examiner

*Primary Examiner* — Aaron M Richer
*Assistant Examiner* — Vu Nguyen
(74) *Attorney, Agent, or Firm* — Hanley, Flight and Zimmerman, LLC

(57) ABSTRACT

Systems and methods for displaying patient-related data to a care provider are provided. Patient-related values are received. The quantity of values is greater than a graph overflow threshold indicative of an amount of display space of a graph. A set of visible values is defined based at least in part on the graph overflow threshold. Sets of hidden values and anomalous values are also defined. The values in the visible-value set are displayed within the display space of the graph. An anomaly indicator is provided for any value in both the visible-value set and the anomalous-value set, to notify a care provider of any visible anomalous patient-related value. An overflow identifier is displayed instead of any value in the hidden-values set. The overflow identifier indicates the number of values in the hidden-value set to inform the care provider as such.

20 Claims, 8 Drawing Sheets

SYSTEMS AND METHODS FOR DISPLAYING PATIENT-RELATED DATA

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND

Hospitals and clinicians today are facing pressure to deliver high quality patient care, prevent adverse events/errors, and implement clinical best practices while reducing the cost of healthcare delivery. Furthermore, hospitals can face dramatic variation in clinical demand and are increasingly likely to be declined reimbursement when patient care falls short. Hospitals that operate at or over capacity may experience heightened rates of safety events. Current support is provided based on anticipated, static events, and do not account for chaos and unpredictability associated with many medical events.

BRIEF SUMMARY

Certain examples of the present invention provide systems and methods for displaying patient-related data.

Certain examples provide a method for displaying patient-related data to a care provider. The method includes receiving multiple values relating to one or more patients. The quantity of the multiple values is greater than a graph overflow threshold indicative of an amount of display space of a graph. The method includes defining a set of visible values based at least in part on the graph overflow threshold. The set of visible values includes some but not all of the multiple values. A set of hidden values includes those of the multiple values not in the set of visible values. A set of anomalous values includes any value of the multiple values that qualifies for an anomalous condition. The method includes displaying within the display space of the graph the values in the set of visible values. The method includes providing an anomaly indicator for any value in both the set of visible values and the set of anomalous values, to notify a care provider of any visible anomalous value relating to the one or more patients. The method includes displaying, instead of any value in the set of hidden values, an overflow identifier indicating the number of values in the set of hidden values, to inform the care provider how many values relating to the one or more patients are not displayed.

Certain examples provide a system for displaying patient-related data to a care provider. The system includes a processor connected to a memory. The processor is programmed to implement the system having a database interface to receive multiple values relating to one or more patients. The quantity of the multiple values is greater than a graph overflow threshold indicative of an amount of display space of a graph. The system includes a decision module to define a set of visible values based at least in part on the graph overflow threshold. The set of visible values includes some but not all of the multiple values. A set of hidden values includes those of the multiple values not in the set of visible values. A set of anomalous values includes any value of the multiple values that qualifies for an anomalous condition. The system includes a user interface to display within the display space of the graph the values in the set of visible values, and to provide an anomaly indicator for any value in both the set of visible values and the set of anomalous values to notify a care provider of any visible anomalous value relating to the one or more patients, and to display in lieu of any value in the set of hidden values an overflow identifier indicating the number of values in the set of hidden values to inform the care provider how many values relating to the one or more patients are not displayed.

Certain examples provide a tangible computer-readable storage medium comprising instructions that, when executed, cause a processor to at least receive multiple values relating to one or more patients. The quantity of the multiple values is greater than a graph overflow threshold indicative of an amount of display space of a graph. The processor is to define a set of visible values based at least in part on the graph overflow threshold. The set of visible values includes some but not all of the multiple values. A set of hidden values includes those of the multiple values not in the set of visible values. A set of anomalous values includes any value of the multiple values that qualifies for an anomalous condition. The processor is to display within the display space of the graph the values in the set of visible values. The processor is to provide an anomaly indicator for any value in both the set of visible values and the set of anomalous values, to notify a care provider of any visible anomalous value relating to the one or more patients. The processor is to display, instead of any value in the set of hidden values, an overflow identifier indicating the number of values in the set of hidden values, to inform the care provider how many values relating to the one or more patients are not displayed.

Figure 1:
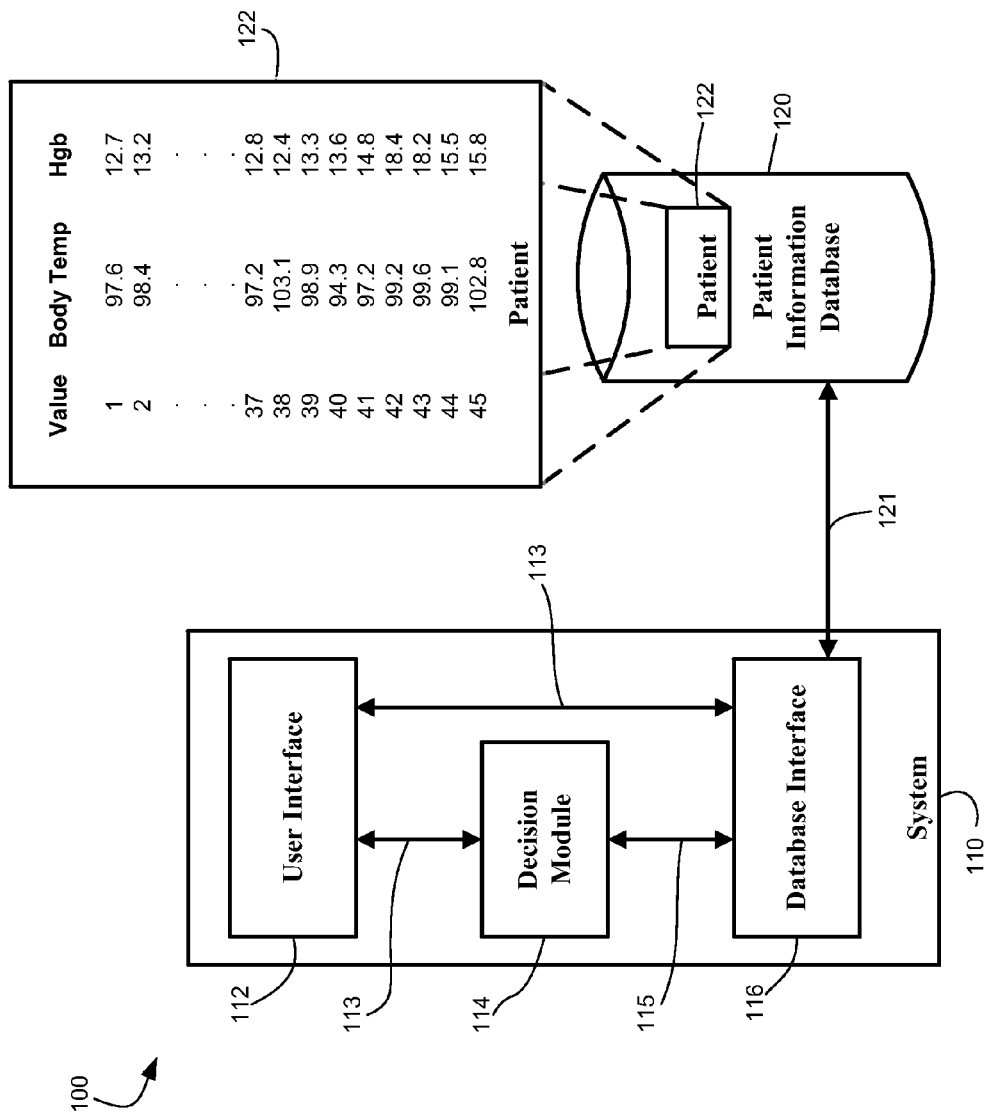
FIG. 1 illustrates an environment in which example systems and methods for displaying patient-related data can operate.

The foregoing summary, as well as the following detailed description of certain examples of the present invention, will be better understood when read in conjunction with the appended drawings. For the purpose of illustrating the invention, certain examples are shown in the drawings. It should be understood, however, that the present invention is not limited to the arrangements and instrumentality shown in the attached drawings.

DETAILED DESCRIPTION OF CERTAIN EMBODIMENTS

Although the following discloses example methods, systems, articles of manufacture, and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods, systems, articles of manufacture, and apparatus, the examples provided are not the only way to implement such methods, systems, articles of manufacture, and apparatus.

When any of the appended claims are read to cover a purely software and/or firmware implementation, at least one of the elements in an at least one example is hereby expressly defined to include a tangible medium such as a memory, DVD, CD, etc. storing the software and/or firmware.

FIG. 1 shows an example processor-implemented environment 100. The environment 100 includes a system 110 for displaying patient-related data to a care provider. The system 110 includes a user interface 112, a decision module 114, and a database interface 116. The user interface 112 is electrically or logically connected to the decision module 114 and to the database interface 116, as indicated by arrows 113. The decision module 114 is electrically or logically connected to the database interface 116, as indicated by arrow 115.

The processor-implemented environment 100 also includes a patient-information database 120, which stores patient-related data. The patient information database 120 can store any data related to a patient, including the patient's vitals, the patient's identification information, the patient's medical history, and/or the like. Suitable examples of patient-related data include, but are not limited to, a patient's blood pressure, body temperature, and/or heart rate. These examples of patient-related data are illustrative, not exhaustive.

The database interface 116 of the system 110 is configured to receive information from, and send information to, the patient-information database 120, as indicated by arrow 121. For instance, the database interface 116 can receive patient data 122 from, or send one or more sets of patient data to, the patient-information database 120. Part of an example patient data set 122 is shown in FIG. 1. The patient data set 122 relates to patient 240 (to be discussed further below with reference to FIG. 2). As shown, the data set 122 includes the patient's body temperature levels and hemoglobin levels. Of course, the data set 122 may include other patient related data. The shown data set 122 includes forty-five sets of body temperature values and hemoglobin values. Of course, the data set 122 may include greater or fewer values than shown.

Figure 2:
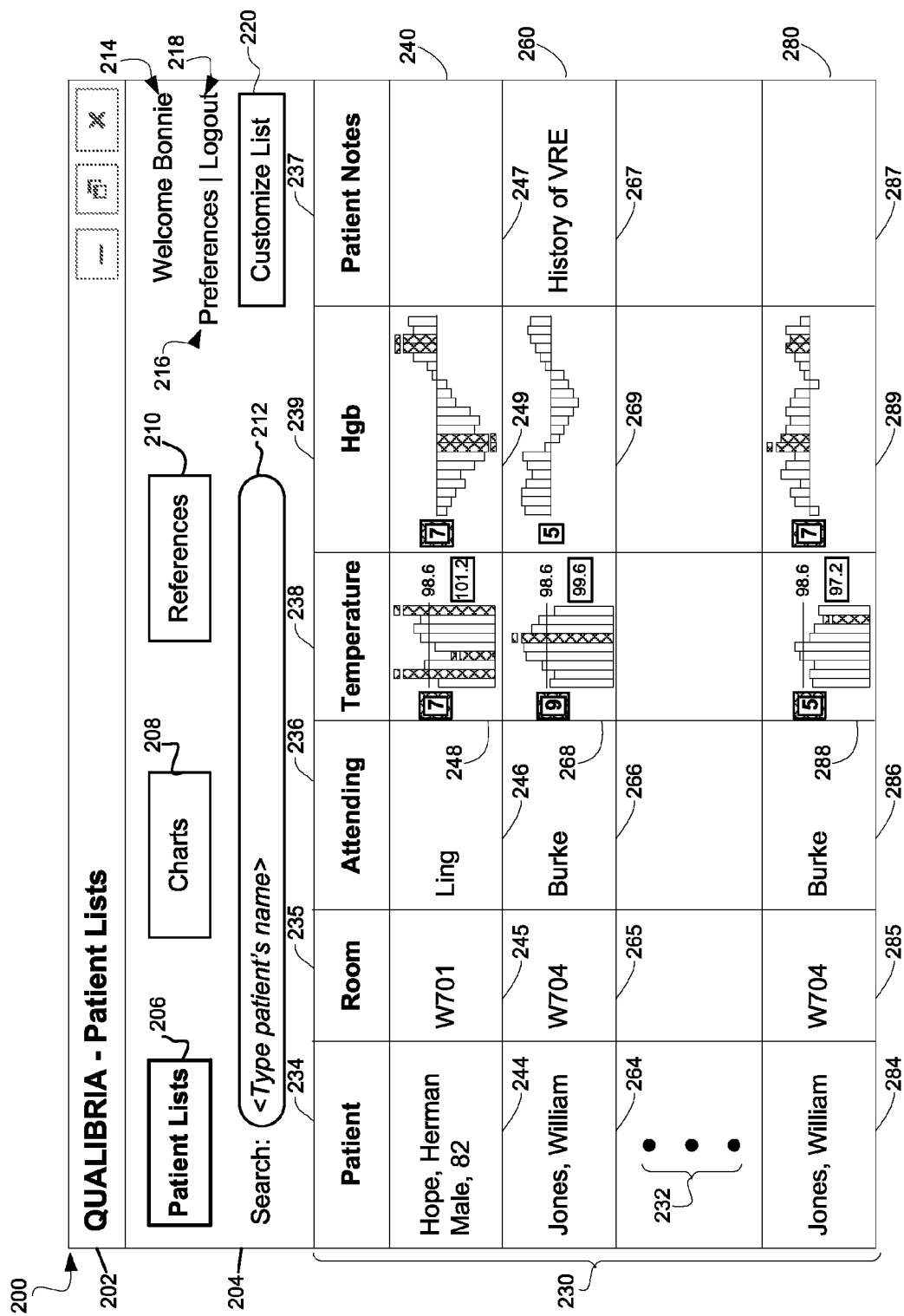
FIG. 2 illustrates an example application window for displaying patient-related data.

FIG. 2 shows an example application window 200 of an example healthcare application displaying data from an enterprise clinical information system such as General Electric's Qualibria® system. The application window 200 includes a standard header portion 202, which identifies the application window and includes options to enable a care provider to modify the application window's size. The application window also has an options portion 204, which has three mode buttons: a patient list button 206 to put the application in a patient list mode, a charts button 208 to put the application in a charts mode, and a references button 210 to put the application in a references mode. The shown example application window 200 is in patient list mode, as reflected by the application window's header portion 202 and by the emphasized outline of the patient lists button 206. Also in the header portion are a search option 212, a greeting 214, a preferences link 216, a logout link 218, and a customize list link 220.

The remainder of the application window 200 forms a patient information portion 230, which includes information about several patients in tabular form. In the example application window 200, information about three patients (240, 260, and 280) is shown. As ellipses 232 shows, the number of patients shown is illustrative, not exhaustive, and the patient information portion 230 can accommodate information relating to fewer or additional patients. The patient information portion 230 includes columns to list or depict each patient's identification information (234), each patient's room (235), the name of each patient's attending physician (236), each patient's body temperature (238), each patient's hemoglobin (Hgb) levels (239), and any notes relating to each patient (237). As shown, columns 234-237 list patient-related information textually, and columns 238-239 depict patient-related information graphically.

For instance, as shown by textual portions 244-247, patient 240 is Herman Hope, an 82-year-old male (244) whose room number is W701 (245), whose attending physician is Dr. Ling (246), and for whom no notes have been recorded (247). Graphical portion 248 graphically depicts Mr. Hope's body temperature, and graphical portion 249 graphically depicts his hemoglobin levels. Information is similarly presented for patients 260 and 280, and may be similarly presented for any additional patients not shown.

As shown, the size of graphical portion 248 is constrained vertically by the header 202 and the options portion 204, and horizontally by columns 234-237 and 239. These size constraints limit the space in which graphical portion 248 may be displayed. Graphical portions 249, 268-269, and 288-289 face similar size constraints and therefore have limited display spaces. As noted above, the example patient information database 120 (shown in FIG. 1) stores forty-five temperature values and forty-five hemoglobin values for patient 240. Displaying the ninety values within graphical portions 248 and 249 would lead to poor display fidelity, causing a care provider difficulty in interpreting relevant patient-related data.

Figure 3:
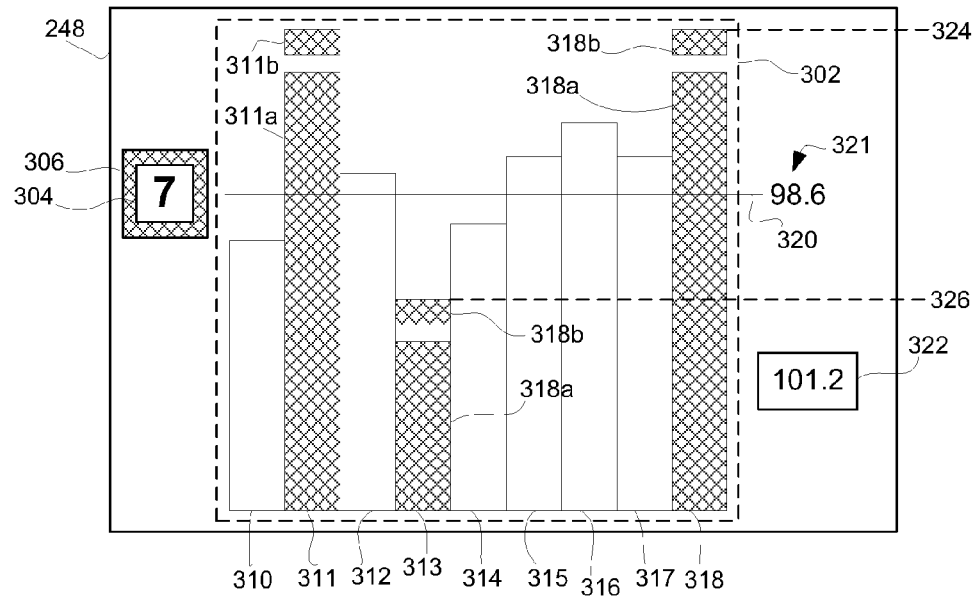
FIG. 3 illustrates an example graph for displaying patient-related data.

FIG. 3 shows an enlarged view of graphical portion 248. Within the graphical portion 248 is a display space 302, a defined space in which patient-related data may be graphically displayed. The display space 302 is depicted by phantom lines, which are illustrative and may, but need not, appear in the graphical portion 248. In the example display space 302 are nine bars 310-318, which correspond to the last nine body temperature values in the patient data set 122 (shown in FIG. 1). An average line 320 runs through the nine bars 310-318, and an average count 321 sits to the right of the average line 320 and to the right of display space 302. The average line 320 graphically depicts an ideal patient body temperature (e.g., 98.6 degrees Fahrenheit), and the average count 321 numerically displays this body temperature.

A care provider may find anomalous values in a set of patient-related data of interest. A value is anomalous if it qualifies for an anomalous condition. In the example graphical portion 248, which concerns patient 240's body temperature values, a value qualifies as anomalous if it exceeds or falls short of the average count 321 by a predetermined amount— for example, four degrees Fahrenheit. In the example data set, of the displayed nine bars 310-318, three bars 311, 313, and 318 qualify as anomalous bars because the values of the three bars 311, 313, and 318 are greater than or less than the average count 321 by at least four degrees Fahrenheit. The shown bars 311, 313, and 318 are cross-hatched to reflect that they represent anomalous values. However, the anomalous bars 311, 313, and 318 may be displayed in various other ways. For instance, they may appear in a different color, shading pattern, or the like.

With continued reference to FIG. 3, each of the anomalous bars 311, 313, and 318 is represented by two separate portions and is truncated to one of two predetermined levels. For instance, anomalous bar 311 is divided into portion 311a and portion 311b. Likewise, anomalous bar 313 is divided into portion 313a and 313b, and anomalous bar 318 is divided into portion 318a and 318b. Because anomalous bars 311 and 318 are greater than the average count 321 by at least four degrees Fahrenheit, anomalous bars 311 and 318 are truncated in display height to a first level 324. Likewise, because anomalous bar 313 is less than the average count 321 by at least four degrees, anomalous bar 313 is truncated in display height to a second level 326. The first level 324 and second level 326 are represented in FIG. 3 by phantom lines, which may, but need not, be displayed. The phantom lines representing the first level 324 and second level 326 may selectively appear in response to a user action. The user may, for example, select an option to activate or deactivate the phantom lines. The phantom lines may, for example, appear when the user presses a keyboard combination or moves a cursor in one or more areas of the graphical portion. The phantom lines may be represented differently, for example, as solid lines or as graph axis markers. These examples are illustrative, not exhaustive.

Truncating anomalous bars 311, 313, and 318 and displaying them differently from the other bars 310, 312, 314, 315, and 316 can have the effect of maintaining the display fidelity of the non-anomalous bars while still alerting a care provider of any anomalous patient-related values.

Outside the display space 302 of the example graphical portion 248 is an average body temperature indicator 322, which indicates the mean value of the values represented by bars 310-318. The average body temperature indicator 322 need not be located outside the display space 302. In addition, the graphical portion 248 may include other or additional indicators. For instance, the graphical portion 248 may include an indicator that shows the maximum of the values represented by bars 310-318, the minimum, the quantity of anomalous values, the quantity of non-anomalous values, and/or the like. The average body temperature indicator 322 or any other indicator in the graphical portion 248 may relate to a set of values other than, or in addition to, the values represented by the visible bars (e.g., bars 310-318). For instance, the average body temperature indicator 322 may represent the average of all the values in patient data 122 (shown in FIG. 1). The average body temperature indicator 322 may instead represent the average of values corresponding to bars 310-318 and values in one or more hidden sets (to be discussed).

Figure 4:
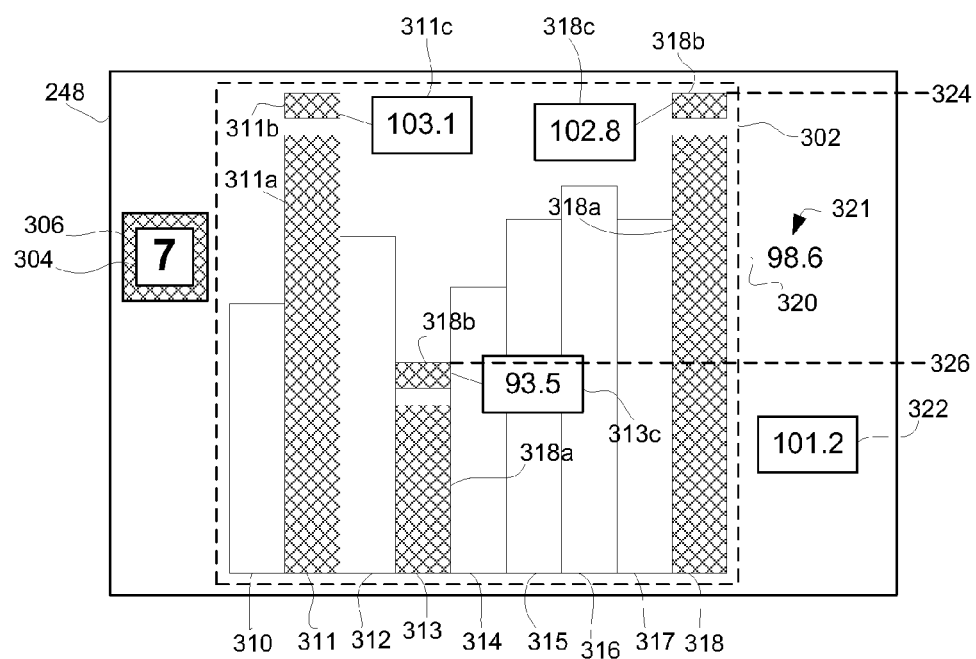
FIG. 4 illustrates the graph shown in FIG. 3 after the occurrence of a user action.

Examples described herein enable a user, such as a care provider, to determine the value corresponding to an anomalous bar while maintaining graphical display fidelity of non-anomalous bars. With reference to FIG. 4, for example, a user can perform one or more actions via the user interface 112 to determine the value(s) of one or more of the anomalous bars 311, 313, and 318 while the anomalous bars 311, 313, and 318 remain at their respective truncated levels 324 and 326. For example, to cause one or more of the corresponding values 311c, 313c, and 318c to appear on the user's display, a user can move a mouse cursor over one or more of the anomalous bars 311, 313, and 318, press one or more designated keys of a keyboard, and/or the like. For instance, a user could move the mouse cursor over portion 311a or 311b of anomalous bar 311c to display that bar's corresponding value 311c (103.1 degrees Fahrenheit). The corresponding values 311c, 313c, and 318c can appear at predetermined intervals (e.g., every 30 seconds). The corresponding values 311c, 313c, and 318c can appear when the corresponding patient's information first appears in the patient information portion 230 of the application window 200. These user actions are illustrative, not exhaustive.

Figure 5:
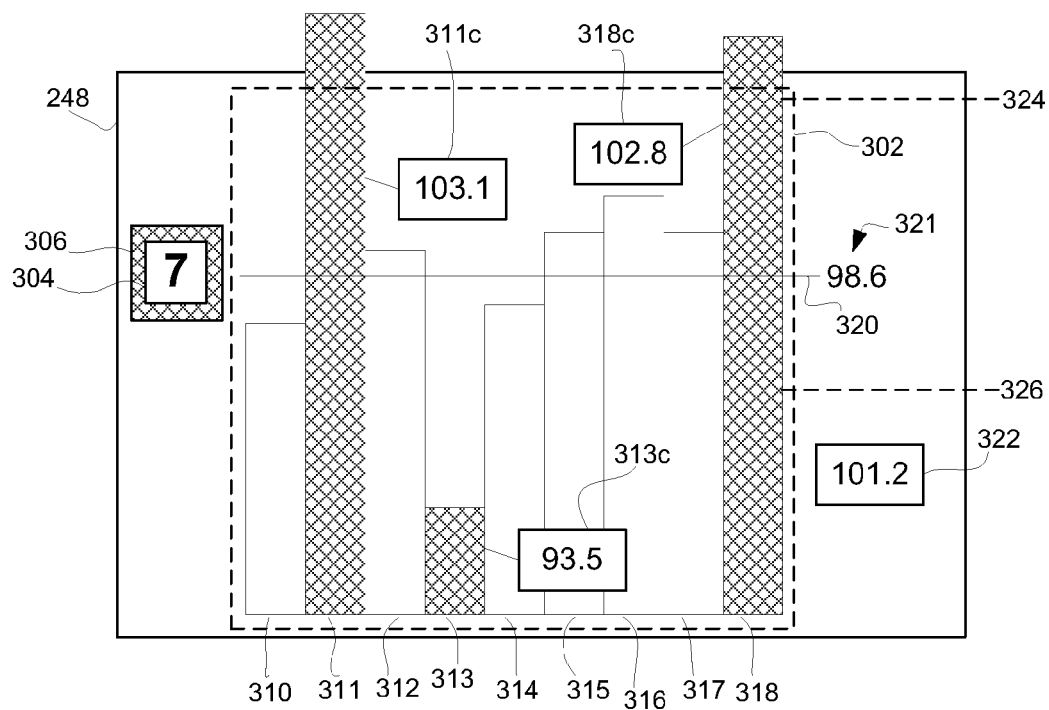
FIG. 5 illustrates the graph shown in FIG. 3 or FIG. 4 after the occurrence of a user action.

FIG. 5 shows another exemplary graphical portion 248 in which a user can determine the value(s) corresponding to one or more anomalous bars while maintaining graphical fidelity of non-anomalous bars. As shown, the anomalous values 311 and 318, previously truncated in display height to level 324, are displayed at their non-truncated display heights. Notice that the anomalous bars 311 and 318 extend beyond the boundaries of the display space 302 and the graphical portion 248. Likewise, anomalous bar 313, previously truncated in display height to level 326, is displayed at its non-truncated display height. Similar to the graphical portion 248 shown in FIG. 4, the graphical portion 248 depicted in FIG. 5 is responsive to an action by a user via the user interface 112. The anomalous bars 311, 313, and 318 may therefore increase or reduce in display height in response to a user action via the user interface 112 (e.g., moving the mouse cursor over one or more of the anomalous bars 311, 313, 318). Any suitable user action via the user interface 112 suffices to accomplish the described display modifications to the anomalous bars 311, 313, and 318.

With reference to FIG. 3, there is an overflow identifier 304 outside the display space 302. The overflow identifier 304 indicates the number of values in a set of hidden values, which may include any value in the patient data 122 other than the values displayed in the display space 302. For example, as described above, the example patient data 122 (shown in FIG. 1) includes forty-five body temperature values, nine of which are displayed as bars 310-318 in the display space 302. For the example patient data 122, therefore, the set of hidden values can include up to thirty-six values. As shown by the overflow identifier 304, the set of hidden values has been defined to include seven values. Of course, the set of hidden values may be defined to include a different number of values.

With continued reference to FIG. 3, there is displayed around the overflow identifier 304 an anomaly indicator 306 to indicate that one or more of the hidden values is anomalous. The presence of the anomaly indicator 306 can notify a care provider that values of interest are not shown in patient 240's body temperature graph, and the absence of the anomaly indicator 306 can indicate that the patient data not shown is generally acceptable. The anomaly indicator 306 thus notifies the care provider of hidden data that might be of interest, permits the care provider to avoid extraneous data, and facilitates increased display fidelity. The shown anomaly indicator 306 is cross-hatched, but may of course be displayed in various other ways. For instance, the anomaly indicator 306 may appear in a different color, shading pattern, or the like.

Figure 6:
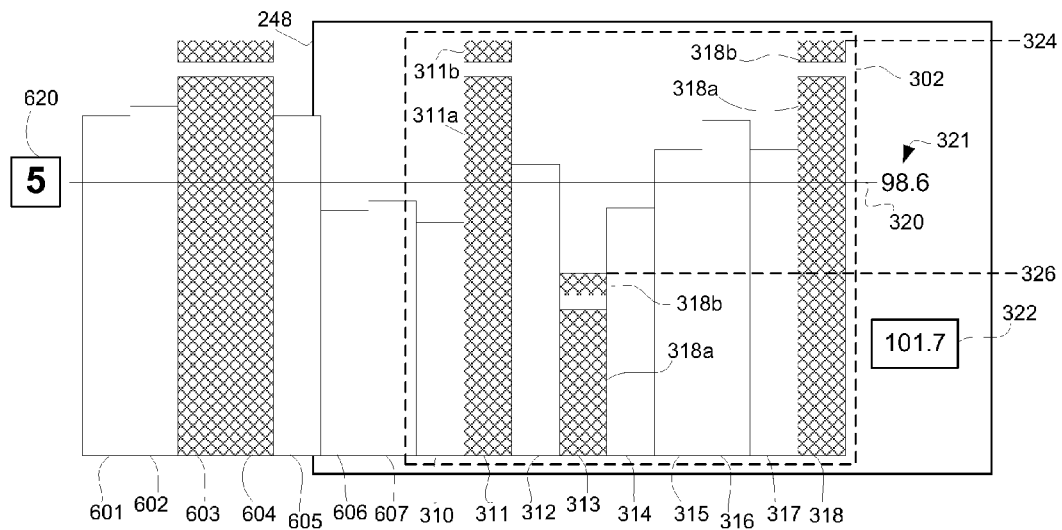
FIG. 6 illustrates the graph shown in FIG. 3 after a user selects an overflow identifier.
Figure 7:
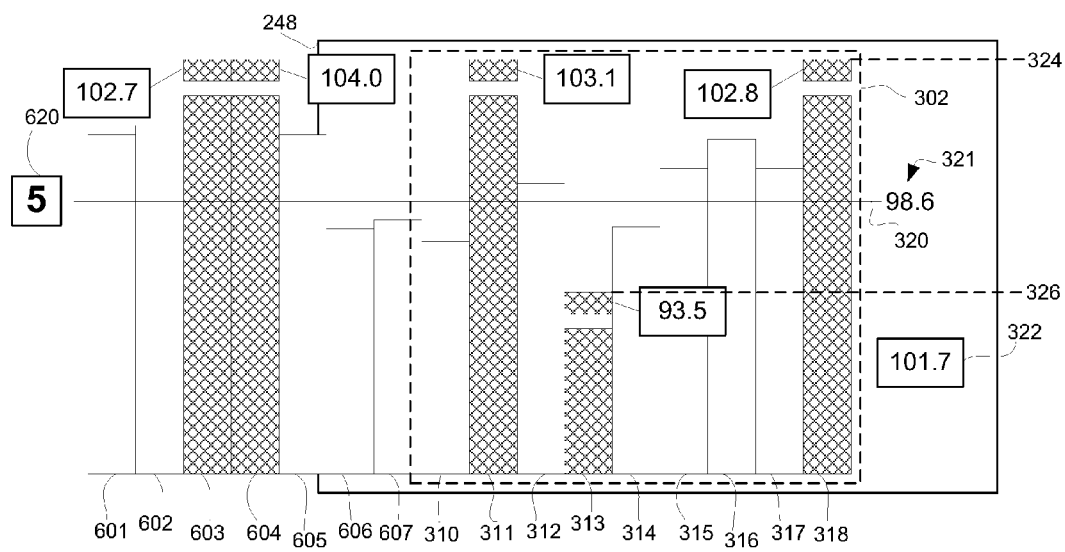
FIG. 7 illustrates the graph shown in FIG. 3 or FIG. 6 after the occurrence of a user action.
Figure 8:
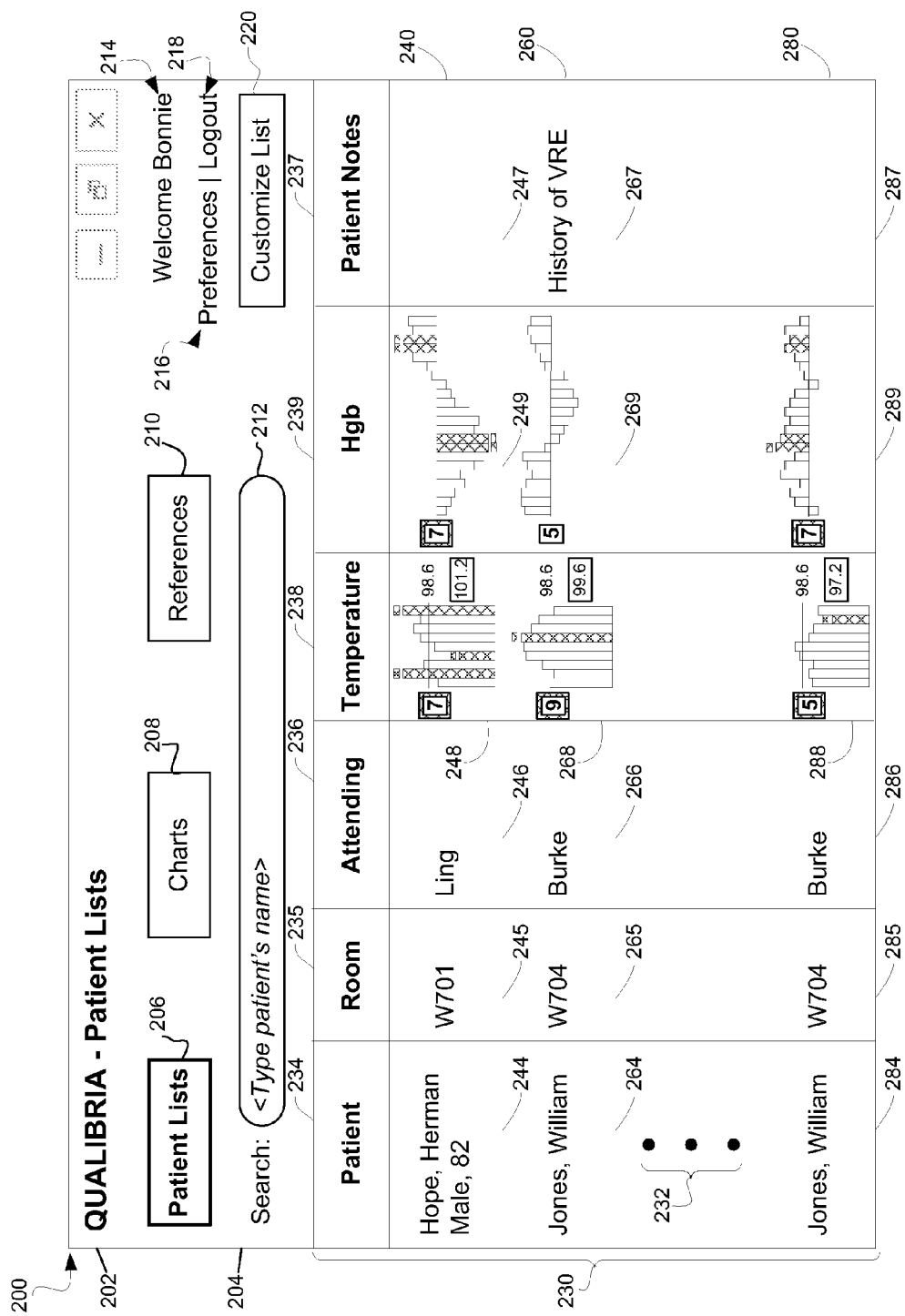
FIG. 8 illustrates the example application window of FIG. 2 implementing the graph shown in FIG. 6.

With reference to FIGS. 6-8, the graphical portion 248 is shown after a user selects the overflow identifier 304. Like the graphical portion 248 previously shown, the graphical portion in FIGS. 6-8 includes the visible set of bars 310-318. However, in place of the overflow identifier 304, there are displayed seven bars 601-607 corresponding to the seven values in the hidden set. Bars 603 and 604 are anomalous and thereby trigger the anomaly indicator 306 shown in FIGS.

3-5, and bars 601-602 and 605-607 are non-anomalous. Together, bars 601-607 constitute a set of hidden bars corresponding to the values in the hidden set.

In the example graphical portion 248, the hidden bars 601-607 appear after a user selects the overflow identifier 304. However, the hidden bars 601-607 may appear in response to any other user action via the user interface 112. For example, the hidden bars 601-607 may appear if a user moves a mouse cursor over a predetermined part of the graphical portion (e.g., the visible bars 310-318). As another example, the hidden bars 601-607 may appear if a user presses one or more predetermined keys on a keyboard. Similarly, the hidden bars 601-607 may disappear from display in response to a user action via the user interface 112. For example, the hidden bars 601-607 can disappear from display and the overflow identifier 304 can reappear in place of the hidden bars 601-607 when a user moves a mouse cursor outside the graphical portion. These examples are illustrative, not exhaustive, and any user action via the user interface 112 can accomplish the purpose of displaying or hiding the hidden bars 601-607.

With reference to FIG. 7, a user can view value(s) corresponding to one or more of the anomalous bars by performing a user action via the user interface 112, similar to the description provided with reference to FIG. 4. Although not shown, a user may perform an action via the user interface 112 to redisplay the hidden bars 601-607 at their non-truncated display heights, similar to the description provided with reference to FIG. 5.

With reference to FIGS. 6 and 7, to the left of the hidden bars 601-607 is a second overflow identifier 620. The second overflow identifier 620 functions similar to the first overflow identifier 304. When a user selects the second overflow identifier 620, a second set of hidden bars representing a second set of hidden values (not shown) will appear in place of the second overflow identifier 620. Notice that, unlike the first overflow identifier 304, the second overflow identifier 620 is not marked by an anomaly indicator. This means that no value in the second set of hidden values is anomalous. The absence of an anomaly indicator on the second overflow identifier 304 can notify a care provider that no value in the second hidden set is anomalous, thereby enabling the care provider to avoid the display of extraneous information.

With continued reference to FIGS. 6 and 7, notice that the average body temperature indicator has changed from 101.2 degrees Fahrenheit (the mean of the values in the visible set) to 101.7 degrees Fahrenheit (the mean of the values in both the visible set and the hidden set).

Although the graph in graphical portion 248 has been shown as a bar graph, the choice of graph is not meant to be limiting. Any other type of graph, such as, for example, a line graph, scatter plot, pie chart, and/or the like can be used in place of, or in addition to, the described bar graph. For example, with reference to FIG. 2, the systems, methods, and apparatus described herein can be used with any of the graphs shown in graphical portions 249, 268-269, and 288-289. The choice of graph is illustrative, not exhaustive.

Figure 9:
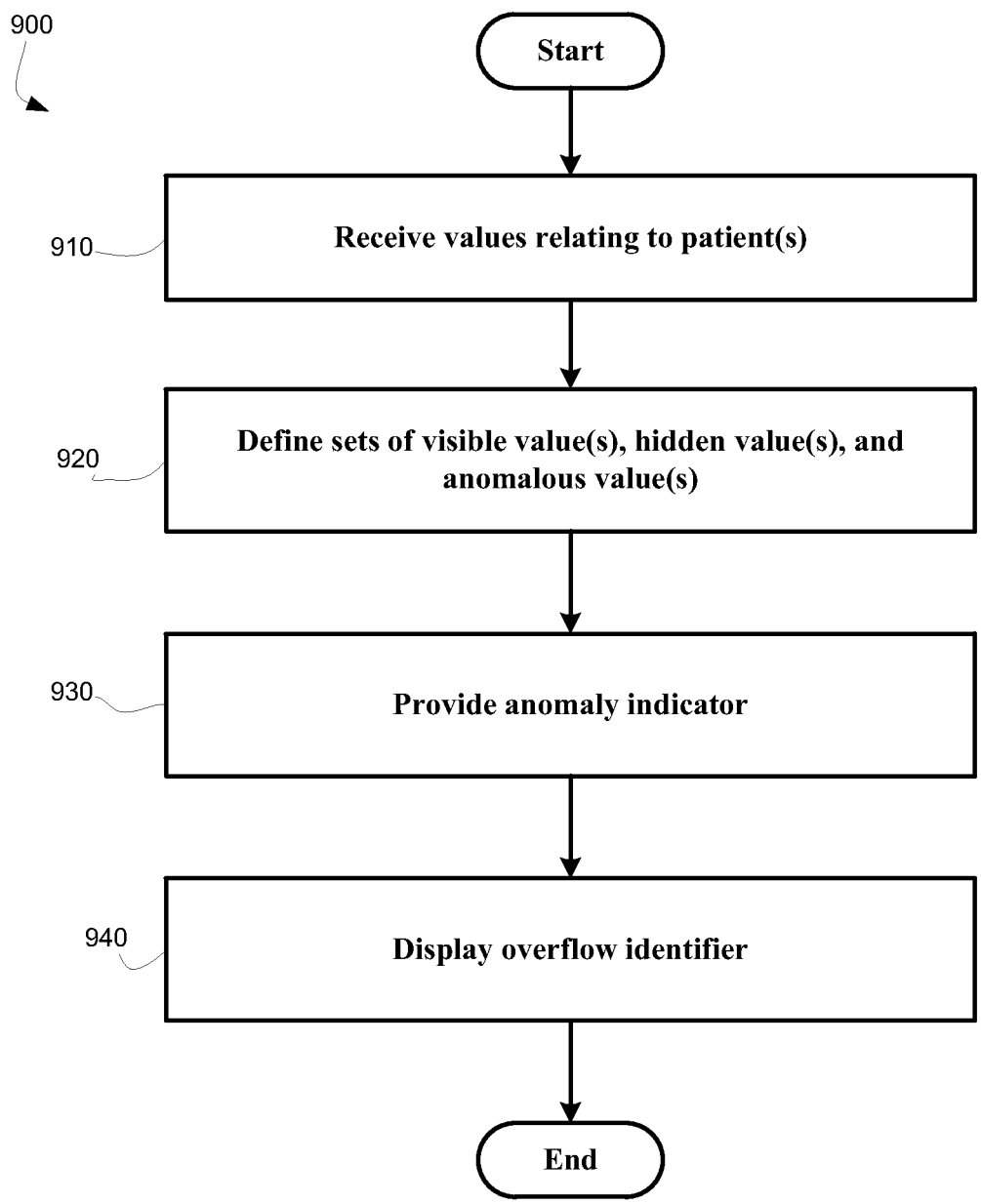
FIG. 9 illustrates a flow diagram depicting an example method for displaying patient-related data to a care provider.

FIG. 9 is a flow diagram representative of example machine readable instructions that can be executed to implement the example systems shown in FIGS. 1-8 and/or portions of one or more of those systems. The example process(es) of FIG. 9 can be performed using a processor, a controller and/or any other suitable processing device. For example, the example process(es) of FIG. 9 can be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example process(es) of FIG. 9 can be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example process(es) of FIG. 9 can be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example process(es) of FIG. 9 can be implemented manually or as any combination(s) of any of the foregoing techniques, for example, any combination of firmware, software, discrete logic and/or hardware. Further, although the example process(es) of FIG. 9 is described with reference to the flow diagram of FIG. 9, other methods of implementing the process(es) of FIG. 9 can be employed. For example, the order of execution of the blocks can be changed, and/or some of the blocks described can be changed, eliminated, sub-divided, or combined. Additionally, any or all of the example process(es) of FIG. 9 can be performed sequentially and/or in parallel by, for example, separate processing threads, processors, devices, discrete logic, circuits, etc.

FIG. 9 is a flow diagram 900 depicting an example method for displaying patient-related data.

Block 910 generally includes receiving multiple values relating to one or more patients. The quantity of the multiple values is greater than a graph overflow threshold indicative of an amount of display space of a graph.

Block 920 generally includes defining a set of visible values based at least in part on the graph overflow threshold. The set of visible values includes some but not all of the multiple values. A set of hidden values includes those of the multiple values not in the set of visible values. A set of anomalous values includes any value of the multiple values that qualifies for an anomalous condition.

Block 930 generally includes providing an anomaly indicator for any value in both the set of visible values and the set of anomalous values. Doing so can notify a care provider of any visible anomalous value relating to the one or more patients.

Block 940 generally includes displaying, instead of any value in the set of hidden values, an overflow identifier indicating the number of values in the set of hidden values. Doing so can inform the care provider how many values relating to the one or more patients are not displayed.

In a variation, the example method generally includes receiving a first user action to display the values in e set of hidden values. Responsive to the first user action, the values in the set of hidden values are displayed at least partially outside the display space of the graph.

In another variation, the example method generally includes receiving a second user action to remove from display the values in the set of hidden values. Responsive to the second user action, the values in the set of hidden values are removed from display.

In another variation, the values in the set of visible values are displayed in a bar graph bars having a fixed width and corresponding to the values in the set of visible values.

In another variation, the method includes receiving a user action to adjust the display space of the graph. Responsive to the user action, the display space of the graph is adjusted. The graph overflow threshold is redefined based at least in part on the adjusted display space of the graph. The sets of visible values, hidden values, and anomalous values are redefined based at least in part on the graph overflow threshold. The values in the redefined set of visible values are displayed within the display space of the graph. An anomaly indicator is provided for any value in both the redefined set of visible values and the redefined set of anomalous values, to notify the care provider of any visible anomalous value relating to the one or more patients. The overflow identifier is displayed, instead of any value in the redefined set of hidden values, to indicate the number of values in the redefined set of hidden values, to inform the care provider how many values relating to the one or more patients are not displayed.

Figure 10:
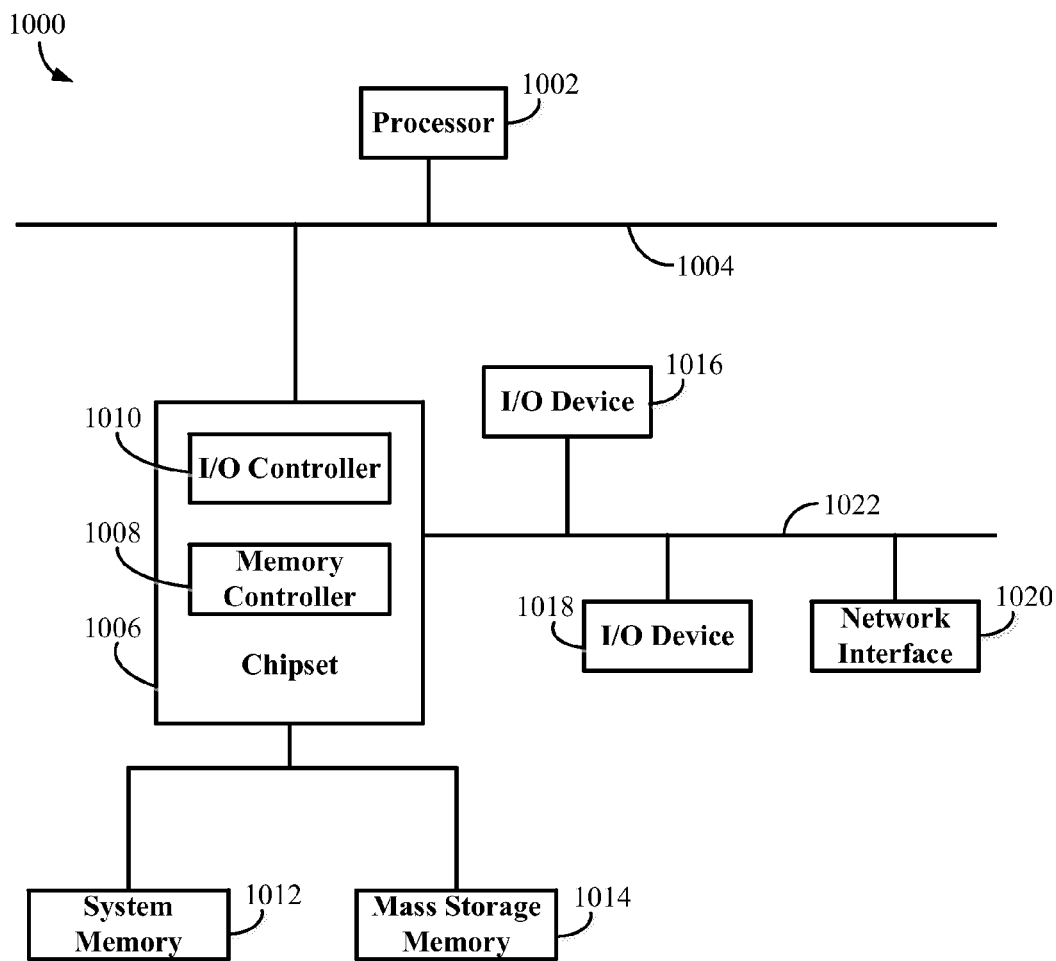
FIG. 10 illustrates a block diagram of an example processor system that can be used to implement the systems, apparatus, and methods described herein.

FIG. 10 is a block diagram of an example processor system 1000 that can be used to implement the apparatus and methods described herein. As shown in FIG. 10, the processor system 1000 includes a processor 1002 that is coupled to an interconnection bus 1004. The processor 1002 may be any suitable processor, processing unit, or microprocessor. Although not shown in FIG. 10, the system 1000 can be a multi-processor system and, thus, can include one or more additional processors that are identical or similar to the processor 1002 and that are communicatively coupled to the interconnection bus 1004.

The processor 1002 of FIG. 10 is coupled to a chipset 1006, which includes a memory controller 1008 and an input/output (I/O) controller 1010. As is well known, a chipset typically provides I/O and memory management functions as well as a plurality of general purpose and/or special purpose registers, timers, etc. that are accessible or used by one or more processors coupled to the chipset 1006. The memory controller 1008 performs functions that enable the processor 1002 (or processors if there are multiple processors) to access a system memory 1012 and a mass storage memory 1014.

The system memory 1012 can include any desired type of volatile and/or non-volatile memory such as, for example, static random access memory (SRAM), dynamic random access memory (DRAM), flash memory, read-only memory (ROM), etc. The mass storage memory 1014 can include any desired type of mass storage device including hard disk drives, optical drives, tape storage devices, etc.

The I/O controller 1010 performs functions that enable the processor 1002 to communicate with peripheral input/output (I/O) devices 1016 and 1018 and a network interface 1020 via an I/O bus 1022. The I/O devices 1016 and 1018 can be any desired type of I/O device such as, for example, a keyboard, a video display or monitor, a mouse, etc. The network interface 1020 may be, for example, an Ethernet device, an asynchronous transfer mode (ATM) device, an 802.11 device, a DSL modem, a cable modem, a cellular modem, etc. that enables the processor system 1000 to communicate with another processor system.

While the memory controller 1008 and the I/O controller 1010 are depicted in FIG. 10 as separate blocks within the chipset 1006, the functions performed by these blocks may be integrated within a single semiconductor circuit or may be implemented using two or more separate integrated circuits.

While the invention has been described with reference to certain embodiments, it will be understood by those skilled in the art that various changes can be made and equivalents can be substituted without departing from the scope of the invention. In addition, many modifications can be made to adapt a particular situation or material to the teachings of the invention without departing from its scope. Therefore, it is intended that the invention not be limited to the particular embodiments disclosed, but that the invention will include all embodiments falling within the scope of the appended claims.

The invention claimed is:

1. A computer-implemented method for displaying patient-related data to a care provider, comprising:
   receiving multiple values relating to one or more patients, the quantity of the multiple values being greater than a graph overflow threshold indicative of an amount of display space of a graph;
   defining a set of visible values based at least in part on the graph overflow threshold and including some but not all of the multiple values, a set of hidden values including those of the multiple values not in the set of visible values, and a set of anomalous values including any value of the multiple values that qualifies for an anomalous condition;
   displaying within the display space of the graph the values in the set of visible values;
   providing an anomaly indicator for any value in both the set of visible values and the set of anomalous values, to notify a care provider of any visible anomalous value relating to the one or more patients; and
   displaying, instead of any value in the set of hidden values, an overflow identifier indicating the number of values in the set of hidden values, to inform the care provider how many values relating to the one or more patients are not displayed.

2. The method of claim 1, further comprising defining the graph overflow threshold based at least in part on the display space of the graph.

3. The method of claim 1, further comprising:
   receiving a first user action to display the values in the set of hidden values; and
   responsive to the first user action, displaying the values in the set of hidden values at least partially outside the display space of the graph.

4. The method of claim 3, further comprising displaying an average value representing the mean of the displayed values in the set of visible values and the displayed values in the set of hidden values.

5. The method of claim 3, further comprising:
   receiving a second user action to remove from display the values in the set of hidden values; and
   responsive to the second user action, removing from display the values in the set of hidden values.

6. The method of claim 1, wherein:
   the graph is a bar graph; and
   displaying the values in the set of visible values comprises displaying in the bar graph bars having a fixed-width and corresponding to the values in the set of visible values.

7. The method of claim 1, further comprising:
   receiving a user action to adjust the display space of the graph;
   responsive to the user action, adjusting the display space of the graph;
   redefining the graph overflow threshold based at least in part on the adjusted display space of the graph;
   redefining the sets of visible values, hidden values, and anomalous values based at least in part on the graph overflow threshold;
   displaying within the display space of the graph the values in the redefined set of visible values;

providing an anomaly indicator for any value in both the redefined set of visible values and the redefined set of anomalous values, to notify the care provider of any visible anomalous value relating to the one or more patients; and displaying, instead of any value in the redefined set of hidden values, the overflow identifier to indicate the number of values in the redefined set of hidden values, to inform the care provider how many values relating to the one or more patients are not displayed.

8. A system for displaying patient-related data to a care provider, comprising:
a processor connected to a memory, the processor programmed to implement the system comprising:
a database interface to receive multiple values relating to one or more patients, the quantity of the multiple values being greater than a graph overflow threshold indicative of an amount of display space of a graph;
a decision module to define a set of visible values based at least in part on the graph overflow threshold and including some but not all of the multiple values, a set of hidden values including those of the multiple values not in the set of visible values, and a set of anomalous values including any value of the multiple values that qualifies for an anomalous condition; and
a user interface to display within the display space of the graph the values in the set of visible values, and to provide an anomaly indicator for any value in both the set of visible values and the set of anomalous values to notify a care provider of any visible anomalous value relating to the one or more patients, and to display in lieu of any value in the set of hidden values an overflow identifier indicating the number of values in the set of hidden values to inform the care provider how many values relating to the one or more patients are not displayed.

9. The system of claim 8, wherein the decision module is to define the graph overflow threshold based at least in part on the display space of the graph.

10. The system of claim 8, wherein the user interface is to receive a first user action to display the values in the set of hidden values, and responsive to the received first user action, the decision module is to display the values in the set of hidden values at least partially outside the display space of the graph.

11. The system of claim 10, wherein the user interface is to display an average value representing the mean of the displayed values in the set of visible values and the displayed values in the set of hidden values.

12. The system of claim 10, wherein the user interface is to receive a second user action to remove from display the values in the set of hidden values, and responsive to the received second user action, the user interface is to remove from display the values in the set of hidden values.

13. The system of claim 8, wherein the graph is a bar graph, and the user interface is to display in the bar graph bars having a fixed-width and corresponding to the values in the set of visible values.

14. The system of claim 8, wherein:
the user interface is to receive a user action to adjust the display space of the graph and, in response, the user interface is to adjust the display space of the graph;
the decision module is to redefine the graph overflow threshold based at least in part on the adjusted display space of the graph, and to redefine the sets of visible values, hidden values, and anomalous values based at least in part on the graph overflow threshold; and
the user interface is to display within the display space of the graph the values in the redefined set of visible values, to provide an anomaly indicator for any value in both the redefined set of visible values and the redefined set of anomalous values, to notify the care provider of any visible anomalous value relating to the one or more patients, and to display, instead of any value in the redefined set of hidden values, the overflow identifier to indicate the number of values in the redefined set of hidden values to inform the care provider how many values relating to the one or more patients are not displayed.

15. A non-transitory computer-readable storage medium comprising instructions that, when executed, cause a processor to at least:
receive multiple values relating to one or more patients, the quantity of the multiple values being greater than a graph overflow threshold indicative of an amount of display space of a graph;
define a set of visible values based at least in part on the graph overflow threshold and including some but not all of the multiple values, a set of hidden values including those of the multiple values not in the set of visible values, and a set of anomalous values including any value of the multiple values that qualifies for an anomalous condition;
display within the display space of the graph the values in the set of visible values;
provide an anomaly indicator for any value in both the set of visible values and the set of anomalous values, to notify a care provider of any visible anomalous value relating to the one or more patients; and
display, instead of any value in the set of hidden values, an overflow identifier indicating the number of values in the set of hidden values, to inform the care provider how many values relating to the one or more patients are not displayed.

16. The storage medium of claim 15, wherein the instructions cause the processor to define the graph overflow threshold based at least in part on the display space of the graph.

17. The storage medium of claim 15, wherein the instructions cause the processor to receive a first user action to display the values in the set of hidden values; and
responsive to the first user action, display the values in the set of hidden values at least partially outside the display space of the graph.

18. The storage medium of claim 17, wherein the instructions cause the processor to display an average value representing the mean of the displayed values in the set of visible values and the displayed values in the set of hidden values.

19. The storage medium of claim 17, wherein the instructions cause the processor to receive a second user action to remove from display the values in the set of hidden values; and responsive to the second user action, to remove from display the values in the set of hidden values.

20. The storage medium of claim 15, wherein the graph is a bar graph;
and wherein the instructions cause the processor to displaying in the bar graph bars having a fixed-width and corresponding to the values in the set of visible values.

* * * * *